United States Patent
Murayama

(10) Patent No.: US 11,459,106 B2
(45) Date of Patent: Oct. 4, 2022

(54) AIRCRAFT WATER SUPPLY SYSTEM

(71) Applicant: The Yokohama Rubber Co., LTD., Tokyo (JP)

(72) Inventor: Hiroshi Murayama, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 17/276,370

(22) PCT Filed: Sep. 13, 2019

(86) PCT No.: PCT/JP2019/036107
§ 371 (c)(1),
(2) Date: Mar. 15, 2021

(87) PCT Pub. No.: WO2020/059661
PCT Pub. Date: Mar. 26, 2020

(65) Prior Publication Data
US 2022/0073206 A1 Mar. 10, 2022

(30) Foreign Application Priority Data
Sep. 18, 2018 (JP) .............................. JP2018-173765

(51) Int. Cl.
*F24D 19/10* (2006.01)
*B64D 11/02* (2006.01)
(Continued)

(52) U.S. Cl.
CPC .............. *B64D 11/02* (2013.01); *B64D 11/04* (2013.01); *G05D 23/1393* (2013.01);
(Continued)

(58) Field of Classification Search
CPC ............ G05D 23/1393; G05D 23/1902; F24D 19/1051
(Continued)

(56) References Cited

U.S. PATENT DOCUMENTS 5,358,177 A * 10/1994 Cashmore .......... G05D 23/1393
137/332
6,705,534 B1 * 3/2004 Mueller ............. G05D 23/1393
236/12.12
(Continued)

FOREIGN PATENT DOCUMENTS

AU 2003235201 A1 10/2003
CN 101839737 A 9/2010
(Continued)

*Primary Examiner* — Kevin F Murphy
(74) *Attorney, Agent, or Firm* — Thorpe North & Western

(57) ABSTRACT

An aircraft water supply system supplies water to a water discharge port in an aircraft. A cold water flow path supplies cold water to the water discharge port. A hot water flow path supplies hot water to the water discharge port. A first control valve adjusts the flow rate of cold water flowing through the cold water flow path. A second control valve adjusts the flow rate of hot water flowing through the hot water flow path. A flow sensor detects the flow rate of water at any point up to the water discharge port. A flow control unit controls the opening/closing state of the first control valve and the second control valve based on the water temperature detected by the flow sensor so that the amount of the water discharged from the water discharge port reaches a predetermined target flow rate.

7 Claims, 5 Drawing Sheets

(51) Int. Cl.
  *B64D 11/04*     (2006.01)
  *G05D 23/19*     (2006.01)
  *G05D 23/13*     (2006.01)

(52) U.S. Cl.
  CPC ..... *G05D 23/1902* (2013.01); *F24D 19/1051* (2013.01); *Y10T 137/7761* (2015.04)

(58) Field of Classification Search
  USPC .................................................. 236/12.15
  See application file for complete search history.

(56) References Cited

U.S. PATENT DOCUMENTS

| | | | |
|---|---|---|---|
| 2006/0231637 A1* | 10/2006 | Schmitt | G05D 23/1393 236/12.11 |
| 2009/0083906 A1 | 4/2009 | Kurita | |
| 2010/0229965 A1 | 9/2010 | Kashima et al. | |
| 2010/0235978 A1 | 9/2010 | Guttau et al. | |
| 2011/0114202 A1* | 5/2011 | Goseco | E03B 7/04 137/487.5 |
| 2017/0052550 A1 | 2/2017 | Akita et al. | |

FOREIGN PATENT DOCUMENTS

| | | |
|---|---|---|
| DE | 102009013558 A1 | 9/2010 |
| EP | 2045687 A2 | 4/2009 |
| EP | 3106764 A1 | 12/2016 |
| JP | 7-28529 A | 1/1995 |
| JP | 2003-311135 A | 11/2003 |
| JP | 2004-81961 A | 3/2004 |
| JP | 2009-83697 A | 4/2009 |
| JP | 4457139 B | 4/2010 |
| JP | 2010-216807 A | 9/2010 |
| JP | 2016-217551 A | 12/2016 |
| KR | 10-2006-0120544 | 11/2006 |
| KR | 10-2010-0103376 A | 9/2010 |
| TW | 201040505 A | 11/2010 |
| WO | 2003/087675 A1 | 10/2003 |
| WO | WO 03/087675 A1 | 10/2003 |

* cited by examiner

AIRCRAFT WATER SUPPLY SYSTEM

TECHNICAL FIELD

The present technology relates to an aircraft water supply system for supplying water to a water discharge port in an aircraft.

BACKGROUND ART

In the related art, two lines, one for cold water and the other for hot water, are connected to a water discharge port provided in a lavatory or the like in an aircraft, and it is possible to switch the temperature or adjust the temperature to an intermediate temperature according to the user's preference.

More specifically, a flow path from a water tank inside an aircraft to a water discharge port is provided with a cold water flow path through which cold water passes and a hot water flow path through which hot water passes. The water in the water tank flows (without being heated) to the cold water flow path as it is. On the other hand, a water heater is provided in the hot water flow path, and water in the water tank is heated and hot water flows through the hot water flow path.

Here, the water tank is filled with compressed air and is configured such that water flows in the direction toward the water discharge port by the pressure from the compressed air. However, since the pressure from the compressed air fluctuates, the flow rate of water flowing in the direction toward the water discharge port is not constant. Therefore, a constant flow valve is provided upstream from the water discharge port so that the flow rate of the water discharged from the water discharge port is constant.

For example, in Japan Patent No. 4457139, a mixing means is provided with a first solenoid valve and a second solenoid valve individually connected to a cold water inlet port and a hot water inlet port, a control signal reflecting the temperature specified by a temperature adjusting means is transmitted to the mixing means via a control wire, and a duty ratio of each of the first solenoid valve and the second solenoid valve is changed based on the specified temperature, whereby the water temperature of the mixed water is adjusted. Furthermore, the amount of the water to be supplied to a discharge unit side is made constant using a flow adjustment member.

In the case where the flow rate is adjusted by the constant flow valve as in the known technology described above, the amount of water (the amount of water used) discharged from a water discharge unit is fixed. Therefore, when it is desired to change the amount of water discharged from the water discharge unit, it is necessary to replace the constant flow valve.

In general, since the constant flow valve is an industrial product, the flow rate thereof depends on the specifications of a manufacturer. For example, it is possible to customize the flow rate according to the wishes of the airline that operates aircrafts, but this is not preferable for a manufacturer because the number of parts increases.

SUMMARY

The present technology enables water to be used in an aircraft to be supplied at a desired flow rate.

The present technology provides an aircraft water supply system for supplying water to a water discharge port in an aircraft, the system including: a cold water flow path that supplies cold water to the water discharge port; a hot water flow path that supplies hot water to the water discharge port; a first control valve that adjusts a flow rate of the cold water flowing through the cold water flow path; a second control valve that adjusts a flow rate of the hot water flowing through the hot water flow path; a flow sensor that detects a flow rate of water at any point up to the water discharge port; and a flow control unit that controls an opening/closing state of the first control valve and the second control valve based on a detection value of the flow sensor so that an amount of the water discharged from the water discharge port reaches a predetermined target flow rate.

According to the present technology, since the amount of water to be discharged from the water discharge port is controlled by controlling the opening/closing state of the first control valve and the second control valve based on the detection value of the flow sensor, it is possible to omit a constant flow valve installed in the related art, which is advantageous in providing a simple and low-cost structure of the aircraft water supply system. Furthermore, when a constant flow valve is used, it is possible to discharge water only at a fixed flow rate, but according to the present technology, the flow rate can be adjusted as desired, and the convenience can be improved.

DETAILED DESCRIPTION

Aircraft water supply systems according to preferred embodiments of the present technology are described in detail below with reference to the accompanying drawings.

Figure 1:
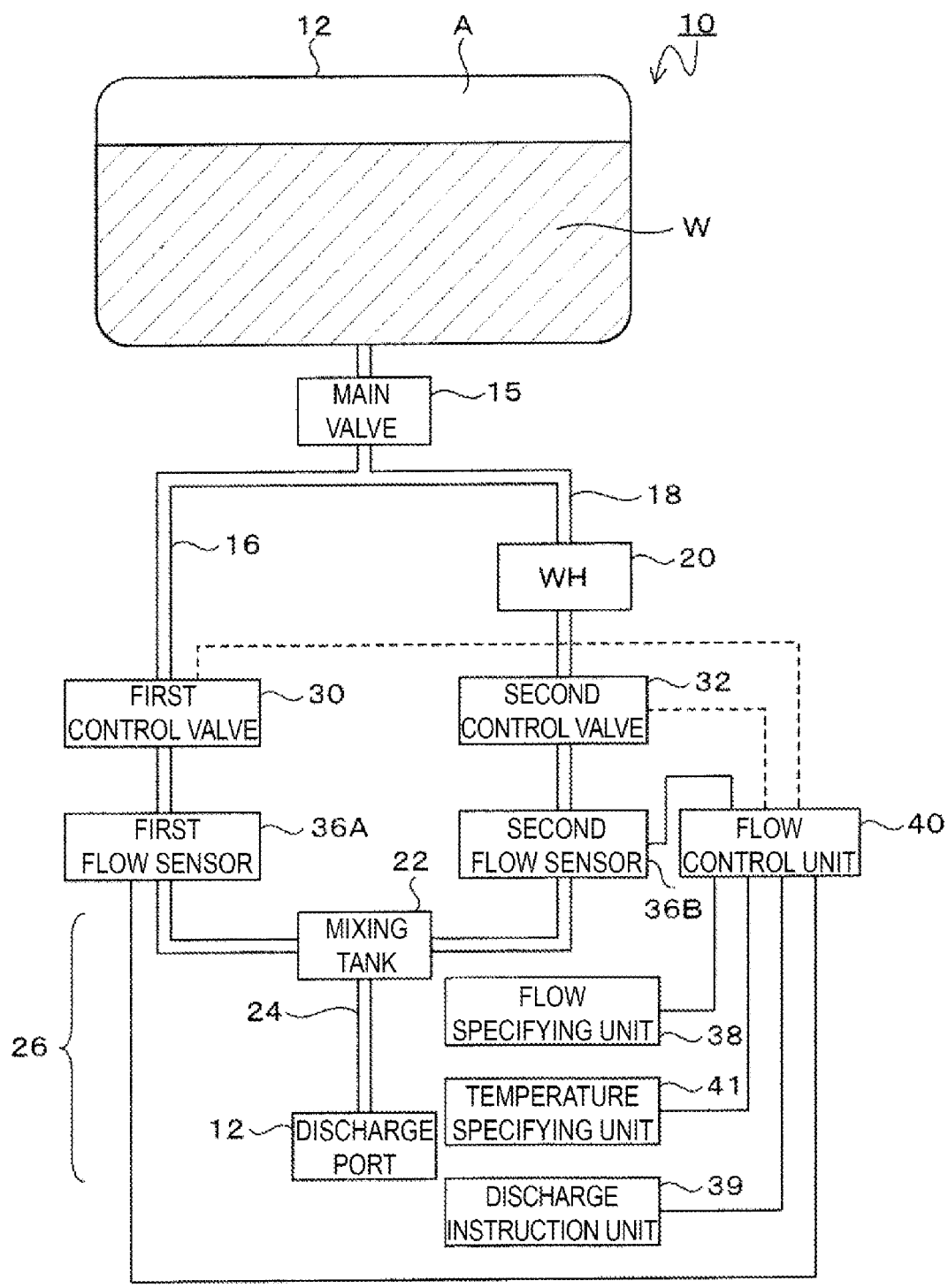
FIG. 1 is a diagram illustrating a configuration of an aircraft water supply system 10.

FIG. 1 is a diagram illustrating a configuration of an aircraft water supply system 10 according to an embodiment.

The aircraft water supply system 10 supplies water to a water discharge port 12 in an aircraft. The water discharge port 12 is installed in a lavatory, a galley, or the like in an aircraft, for example, and provides users with water for hand washing or drinking.

In the present embodiment, it is assumed that the water discharge port 12 is installed in a lavatory inside an aircraft. A hand wash faucet (the water discharge port 12 in the present embodiment) in a lavatory is used by a number of boarding passengers, and the amount of water used is larger than that of a faucet such as a galley used by a limited number of users.

The discharge of the water from the water discharge port 12 is switched on/off by operating a discharge instruction unit 39. The discharge instruction unit 39 is a mechanism such as a sensor, a cock, a switch, or the like provided in the vicinity of the water discharge port 12. For example, the discharge instruction unit 39 may be configured as an automatic faucet such that an infrared sensor is used as the discharge instruction unit 39, a user's hand is detected by the infrared sensor, and water is discharged when the user's hand is held over. Alternatively, the discharge instruction unit 39 may be configured as a manual faucet such that a cock or a switch is used as the discharge instruction unit 39 and water is discharged for a predetermined period in response to the user operating the cock or the switch.

In addition, in the present embodiment, a flow specifying unit 38 that specifies the flow rate (hereinafter referred to as "water discharge amount") of the water to be discharged from the water discharge port 12 is provided. The flow specifying unit 38 is disposed, for example, at a position invisible to a user (a passenger) in the lavatory, and can be operated by only a crew member of an aircraft. The flow specifying unit 38 can be switched between "normal mode" and "water saving mode", for example. The water discharge amount in the "normal mode" is a predetermined reference flow rate, and the water discharge amount in the "water saving mode" is less than the water discharge amount in the normal mode (for example, 70% of normal mode).

The embodiment of the flow specifying unit 38 is not limited to the above example, and for example, the water discharge amount may be changed continuously (at any flow rate), or the water discharge amount may be changed to a plurality of three or more steps.

Additionally, the flow specifying unit 38 may be disposed at a position visible to the boarding passenger so that the flow specifying unit 38 can be operated by each boarder.

Note that the flow specifying unit 38 may not be provided, and a predetermined flow rate (a reference flow rate) may be maintained.

The temperature specifying unit 41 is disposed near the water discharge port 12, for example, and a user can specify the temperature of the water to be discharged from the water discharge port 12. The temperature specifying unit 41 may employ a button-based multi-stage switching system, a dial-based continuous switching system, or the like.

Note that the temperature specifying unit 41 may not be provided, and the water temperature may be maintained at a predetermined set temperature (fixed value).

The water supplied to the water discharge port 12 is stored in a water tank 14 installed in an aircraft. In addition to the water W, the compressed air A is supplied to the water tank 14, and the water W is extruded toward the water discharge port 12 by the pressure from the compressed air A. The temperature of the water W inside the water tank 14 varies depending on the temperature and the like around the tank. In addition, the pressure of the compressed air A also varies depending on the operating state of the engine and compressor of the aircraft that supplies the compressed air A.

The water flow path from the water tank 14 to the water discharge port 12 includes a cold water flow path 16, a hot water flow path 18, and a mixing flow path 24. In the present embodiment, a main valve (a shutoff valve) 15 is first provided downstream from the water tank 14. The main valve 15 is a valve for disconnecting the water tank 14 and the flow paths in the event of abnormalities. The cold water flow path 16 and the hot water flow path 18 are branched downstream from the main valve 15.

Note that the cold water flow path 16 and the hot water flow path 18 may be connected directly to the water tank 14. In this case, main faucets (a cold water faucet and a hot water faucet) may be provided at positions near the water tank 14 of the cold water flow path 16 and the hot water flow path 18, respectively.

The cold water flow path 16 is a flow path for supplying cold water to the water discharge port 12, and is a flow path through which the water W in the water tank 14 flows as it is (without being heated). In the present embodiment, the cold water flow path 16 connects the water tank 14 and the mixing tank 22.

The hot water flow path 18 is a flow path for supplying hot water to the water discharge port 12. In the present embodiment, the hot water flow path 18 connects the water tank 14 and the mixing tank 22. A water heater (WH) 20 is provided in the hot water flow path 18. A heating material is provided in the water heater 20, and water flowing through the hot water flow path 18 is heated by the water heater 20 to become hot water, and the hot water is supplied to the water discharge port 12. The temperature of the hot water heated by the water heater 20 varies depending on factors, for example, such as the temperature of the water W in the water tank 14, the heating performance of the water heater 20, the amount of continuous hot water used (the higher the continuous hot water usage, the lower the heating performance).

In the mixing tank 22, the cold water flowing through the cold water flow path 16 and the hot water flowing through the hot water flow path 18 are mixed.

The mixing flow path 24 connects the mixing tank 22 and the water discharge port 12, and the mixed water of cold water and hot water mixed in the mixing tank 22 flows through the mixing flow path 24.

In the present embodiment, the components ranging from the mixing tank 22 to the mixing flow path 24 form a mixing supply unit 26. The mixing supply unit 26 mixes cold water and hot water downstream from the first control valve 30 and the second control valve 32, which will be described later, and supplies the mixed water to the water discharge port 12.

The cold water flow path 16 and the hot water flow path 18 are each provided with a flow sensor 36 (36A, 36B). The first flow sensor 36A detects the flow rate of cold water flowing through the cold water flow path 16. The second flow sensor 36B detects the flow rate of hot water flowing through the hot water flow path 18. In the present embodiment, each of the flow sensors 36A and 36B is provided downstream from the control valves 30, 32 described below and upstream from the mixing tank 22.

The detection value of the flow sensor 36 (36A, 36B) is output to the flow control unit 40, which will be described later.

The cold water flow path 16 and the hot water flow path 18 are each provided with a control valve for adjusting the flow rate of water flowing through each of the flow paths.

That is, a first control valve 30 that adjusts the flow rate of cold water flowing through the cold water flow path 16 and a second control valve 32 that adjusts the flow rate of hot water flowing through the hot water flow path 18 are provided.

The first control valve 30 and the second control valve 32 are, for example, solenoid valves, and in the present embodiment, are proportional control valves of which the degree of valve opening depends on an input current value.

The type of the valves used as the first control valve 30 and the second control valve 32 are not particularly limited as long as the flow rate of water flowing through each of the flow paths can be adjusted. When a proportional control valve is used, the degree of valve opening can be adjusted arbitrarily (continuously), and the flow rate in each of the flow paths can be adjusted with higher accuracy.

As another example of the valves used as the first control valve 30 and the second control valve 32, an ON-OFF valve of which the opening time (or closing time) per unit time can be adjusted by changing the duty ratio can be used.

The flow control unit 40 (controller) controls the opening/closing state of the first control valve 30 and the second control valve 32 based on the detection values of the first flow sensor 36A and the second flow sensor 36B so that the water discharged from the water discharge port 12 reaches a predetermined target state.

The target state is, for example, a target flow rate and a target temperature of the water.

For example, when the target state is a target flow rate and the flow rate of the water to be discharged from the water discharge port 12 is specified by the flow specifying unit 38, the flow control unit 40 sets the target flow rate based on the flow rate specified by the flow specifying unit 38. Further, the flow control unit 40 sets a predetermined reference flow rate as the target flow rate, for example, when the flow specifying unit 38 is not provided.

In the present embodiment, the flow sensors 36A and 36B are provided downstream from the control valve 30 and 32. Thus, the sum of the flow rates detected by the flow sensors 36A and 36B is approximately equal to the flow rate of the water discharged from the water discharge port 12.

Thus, when the sum of the detection values of the flow sensors 36A and 36B is greater than the target flow rate, for example, the flow control unit 40 controls at least one of the first control valve 30 or the second control valve 32 in the closing direction to reduce the amount of water flowing toward the water discharge port 12. When the sum of the detection values of the flow sensors 36A and 36B is less than the target flow rate, for example, the flow control unit 40 controls at least one of the first control valve 30 or the second control valve 32 in the opening direction to increase the amount of water flowing toward the water discharge port 12.

Further, for example, when the target state is a target temperature, the flow control unit 40 sets a target value of the flow rate ratio between the flow rate of the cold water flowing through the cold water flow path 16 and the flow rate of the hot water flowing through the hot water flow path 18. Then, the opening/closing state of the control valves 30 and 32 is controlled based on the detection values of the first flow sensor 36A and the second flow sensor 36B so that the flow rate ratio of the flow paths reaches the target value.

The target temperature is, for example, the temperature specified by the temperature specifying unit 41, and when the temperature specifying unit 41 is not provided, the target temperature is a predetermined set temperature (fixed value).

The flow control unit 40 sets the flow rate ratio (mixing ratio) of hot water and cold water in advance so as to correspond to each temperature specified by the temperature specifying unit 41 (including a stepwise specification such as cold and hot). Then, the opening/closing state of the first control valve 30 and the second control valve 32 is controlled based on the detection values of the first flow sensor 36A and the second flow sensor 36B so that the flow rate ratio of the hot water and the cold water corresponding to the temperature specified by the temperature specifying unit 41 can be maintained.

In addition, when both the target flow rate and the target temperature are specified, the flow control unit 40 controls the opening/closing state of the first control valve 30 and the second control valve 32 based on the detection values of the first flow sensor 36A and the second flow sensor 36B so that the amount and the temperature of the water discharged from the water discharge 12 reach the target flow rate and the target temperature.

In this case, the flow control unit 40 adjusts the opening/closing state of the first control valve 30 and the second control valve 32 so that the total flow rate of hot water and cold water reaches a target flow rate while maintaining the flow rate ratio of hot water and cold water corresponding to the target temperature, for example.

Note that when the target temperature is not set and only the target flow rate is specified, which degree of opening of the first control valve 30 or the second control valve 32 will be changed is optional. For example, in order to reduce the energy consumption in the water heater 20, a control method of ensuring the flow rate by suppressing the degree of opening of the second control valve 32 (the hot water side) as much as possible and increasing the degree of opening of the first control valve 30 (the cold water side) may be considered. In other words, the flow control unit 40 may control the opening/closing state of the first control valve 30 and the second control valve 32 so that the degree of opening of the second control valve 32 is relatively smaller than the degree of opening of the first control valve 30.

Further, for example, in order to improve the flow rate responsiveness, a control method of opening and closing the first control valve 30 and the second control valve 32 to the same extent may be considered.

In addition, when the flow sensors 36A and 36B are provided upstream from the control valve 30 and 32, for example, (the flow rate detected by the flow sensor 36A)×(the degree of opening of the control valve 30)×(the coefficient based on the characteristics of the control valve 30)=(the flow rate in the cold water flow path 16) and (the flow rate detected by flow sensor 36B)×(the degree of opening of the control valve 32)×(the coefficient based on the characteristics of the control valve 32)=(the flow rate in hot water flow path 18).

That is, when the first flow sensor 36A is provided upstream from the first control valve 30 and the second flow sensor 36B is provided upstream from the second control valve 32, the flow control unit 40 may estimate that the value obtained by multiplying the flow rate detected by the first flow sensor 36A, the degree of opening of the first control valve 30, and the coefficient based on the characteristics of the first control valve 30 is the flow rate in the cold water flow path 16, and the value obtained by multiplying the flow rate detected by the second flow sensor 36B, the degree of opening of the second control valve 32, and the coefficient based on the characteristics of the second control valve 32 is the flow rate in the hot water flow path 18.

Figure 2:
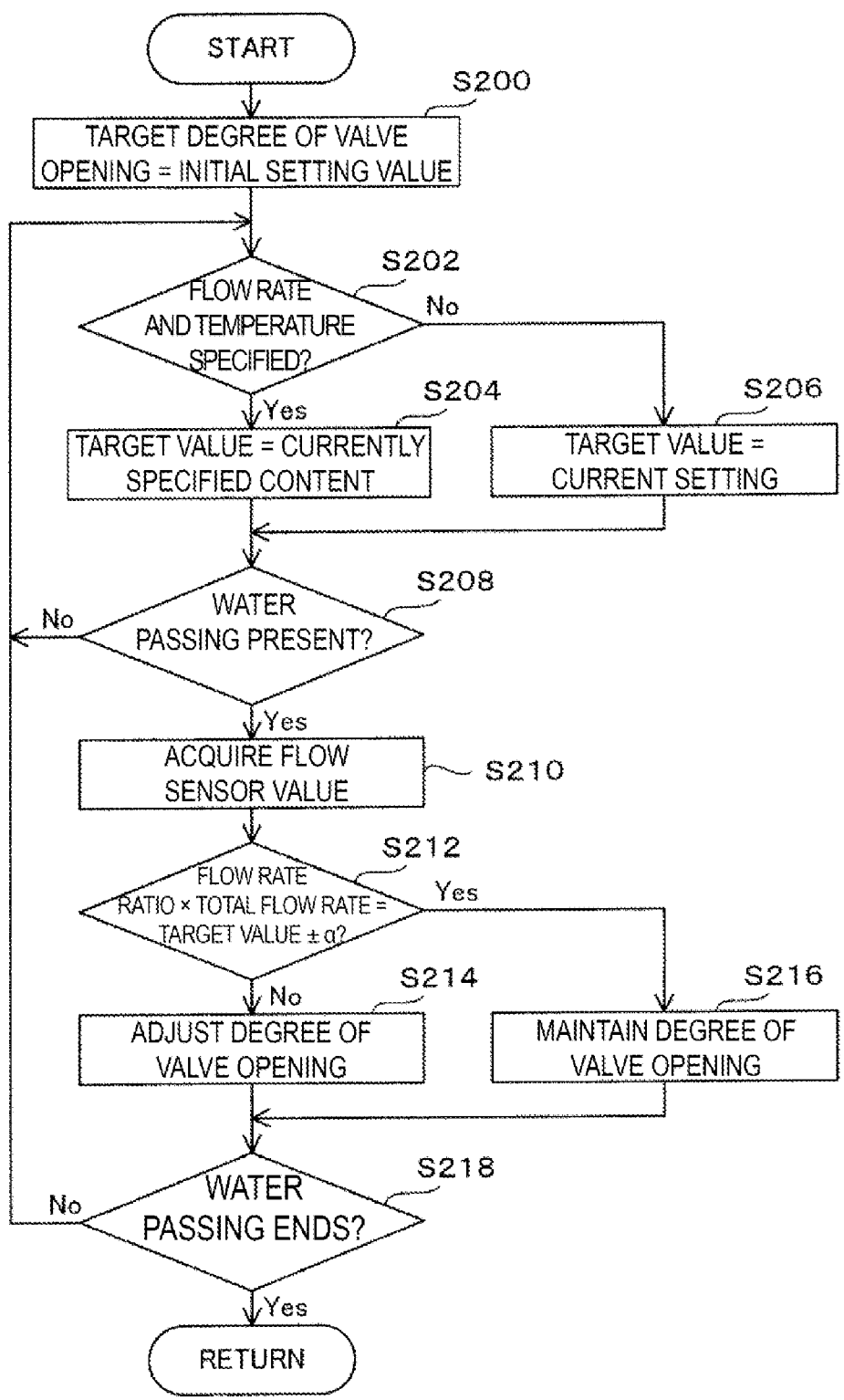
FIG. 2 is a flowchart illustrating processing of a flow control unit 40.

FIG. 2 is a flowchart illustrating processing of the flow control unit 40.

In an initial state, the target valve degree of opening of the first control valve 30 and the second control valve 32 are each set to a predetermined initial setting value (step S200). Moreover, the target values of the flow rate ratio of hot water and cold water and the total flow rate of hot water and cold water (that is, the amount of water discharged from the water discharge port 12) are each set to predetermined initial states.

When a flow rate specifying operation on the flow specifying unit 38 or a temperature specifying operation on the temperature specifying unit 41 is performed (step S202: Yes), the flow control unit 40 changes the target value of the total flow rate of hot water and cold water (when the flow specifying unit 38 is operated) or the target value of the flow rate ratio of hot water and cold water (when the temperature specifying unit 41 is operated) so as to match the presently specified content (step S204). Additionally, when the specifying operation is not performed on the flow specifying unit 38 and the temperature specifying unit 41 (step S202: No), the target value of the total flow rate and flow rate ratio is maintained at the current setting (step S206).

Until an operation (discharge ON operation) is performed on the discharge instruction unit 39 and passing of water is performed (step S208: No loop), the process returns to step S202 and the subsequent processing is continued.

When an operation (discharge ON operation) is performed on the discharge instruction unit 39, the flow control unit 40 opens the first control valve 30 and the second control valve 32 to the target degree of valve opening set in step S200, and starts passing water (step S208: Yes).

The flow control unit 40 acquires the detection values of the first flow sensor 36A and the second flow sensor 36B (step S210) and determines whether the current flow rate ratio of hot water and cold water and the total flow rate of hot water and cold water are in the range of target values±α (α is a predetermined allowable value which is determined individually for the flow rate ratio and the total flow rate) (step S212).

When at least one of the flow rate ratio or the total flow rate is not in the range of the target value±α (step S212: No), the flow control unit 40 changes the degree of valve opening of the first control valve 30 and the second control valve 32 so that the index approaches the target value (step S214). Specifically, for example, when the flow rate of hot water is greater than the target flow rate ratio, the first control valve 30 (the cold water side) is controlled to the opening direction and the second control valve 32 (the hot water side) is controlled to the closing direction. Also, for example, when the total flow rate of the hot water and the cold water is greater than the target value, the first control valve 30 and the second control valve 32 are each controlled to the closing direction while maintaining the flow rate ratio of hot water and cold water.

If both the flow rate ratio and the total flow rate are within the range of the target value±α (step S212: Yes), the flow control unit 40 maintains the degree of valve opening of the first control valve 30 and the second control valve 32 in the current state (step S216).

Until an operation (discharge OFF operation) is performed on the discharge instruction unit 39 and passing of water ends (step S218: No loop), the process returns to step S202 and the subsequent processing is continued. For example, when an operation of changing the specified water temperature is performed during the discharge of water, the target flow rate ratio is changed so as to match the specified water temperature after change.

Then, when an operation (discharge OFF operation) is performed on the discharge instruction unit 39, the first control valve 30 and the second control valve 32 are fully closed to end passing of water (step S218: Yes), and the processing of this flowchart ends.

As described above, in the aircraft water supply system 10 according to the embodiment, since the amount of water to be discharged from the water discharge port 12 is controlled by controlling the opening/closing state of the first control valve 30 and the second control valve 32 based on the detection value of the flow sensor 36 (36A, 36B), it is possible to omit a constant flow valve installed conventionally, which is advantageous in realizing a simple and low-cost structure of the aircraft water supply system 10.

Furthermore, when a constant flow valve is used, it is possible to discharge water only at a fixed flow rate, but according to the aircraft water supply system 10, the flow rate can be adjusted as desired, and the convenience can be improved. For example, when the amount of water discharged from the water discharge port is suppressed to reduce the amount of water used per flight by setting a water saving mode, it is possible to suppress the amount of water loaded into the water tank 14, and thus the weight of an aircraft, which is directly linked to the fuel efficiency, can be reduced.

Furthermore, the aircraft water supply system 10 controls the opening/closing state of the control valves 30 and 32 based on the flow rate specified by the flow specifying unit 38, which is advantageous in providing water at the flow rate desired by the user.

Furthermore, the aircraft water supply system 10 controls the opening/closing state of the control valves 30 and 32 based on the temperature specified by the temperature specifying unit 41, which is advantageous in providing water at a temperature desired by the user.

In addition, in the aircraft water supply system 10, since the flow sensors 36A and 36B are provided in the cold water flow path 16 and the hot water flow path 18, respectively, it is advantageous in grasping the flow rates in the respective flow paths 16 and 18 individually and supplying water efficiently.

Furthermore, the aircraft water supply system 10 uses a proportional control valve as the first control valve 30 and the second control valve 32, which is advantageous in adjusting the flow rates of cold water and hot water with high accuracy.

Note that the installation position of the flow sensors 36A and 36B is not limited to that illustrated in FIG. 1, and, for example, the flow sensors may be provided downstream from the water tank 14 and upstream from the control valves 30 and 32.

Figure 3:
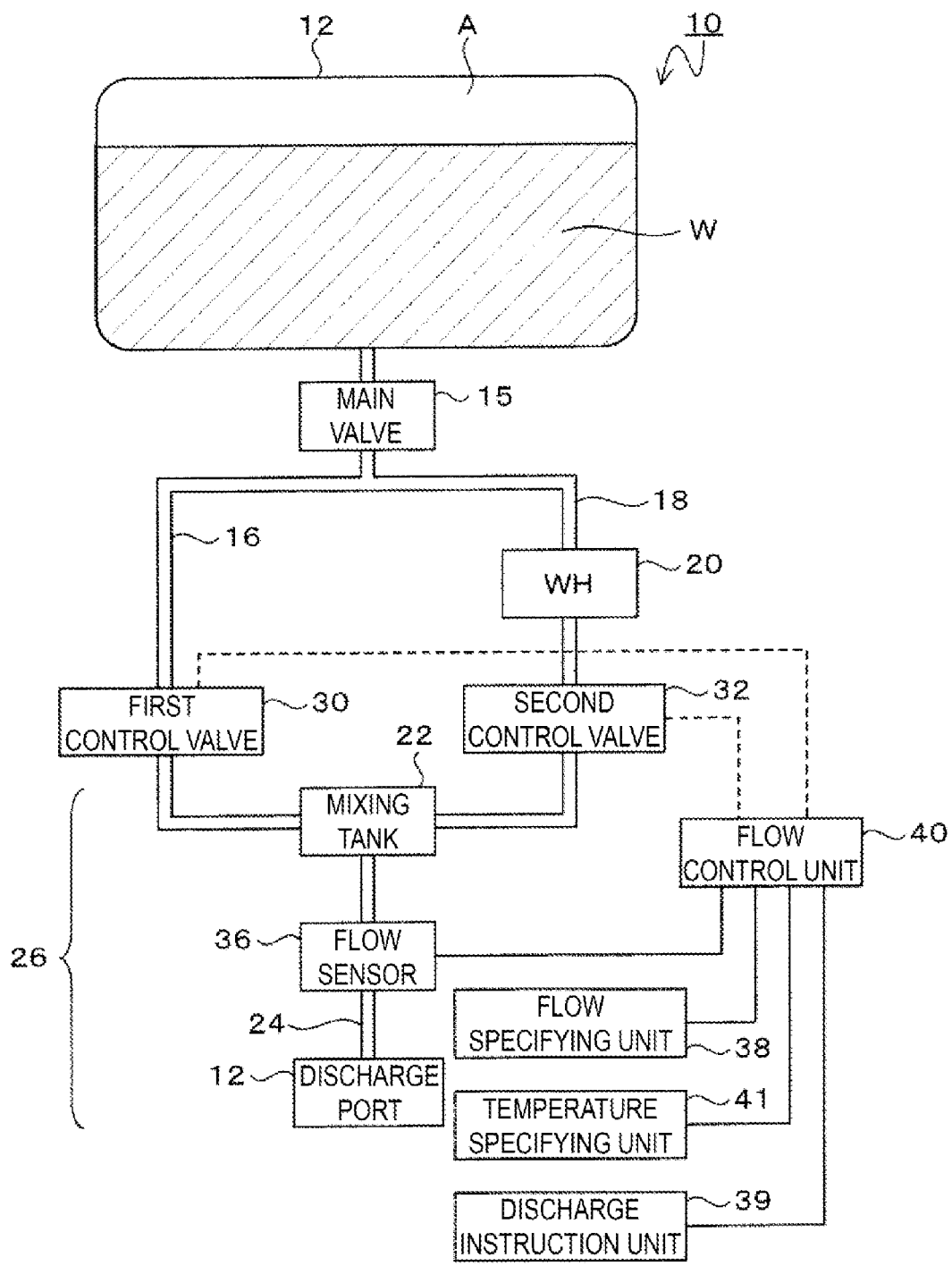
FIG. 3 is a diagram illustrating another configuration of the aircraft water supply system 10.

Furthermore, as illustrated in FIG. 3, for example, the flow sensor 36 may be provided in the mixing supply unit 26 (the mixing tank 22 or the mixing flow path 24), or may be provided directly below the main valve 15 (for example, before the branching point between the cold water flow path 16 and the hot water flow path 18). In this case, the flow sensor 36 detects the flow rate of water at any point from the water tank 14 to the water discharge port 12.

When the flow sensor is provided in the mixing supply unit 26 (the mixing tank 22 and the mixing flow path 24) as illustrated in FIG. 3, the flow rate detected by the flow sensor is the flow rate of the water discharged from the water discharge port 12. In this case, the flow control unit 40 controls the opening/closing state of the first control valve 30 and the second control valve 32 so that the flow rate at the mixing supply unit 26 is the target flow rate.

Figure 4:
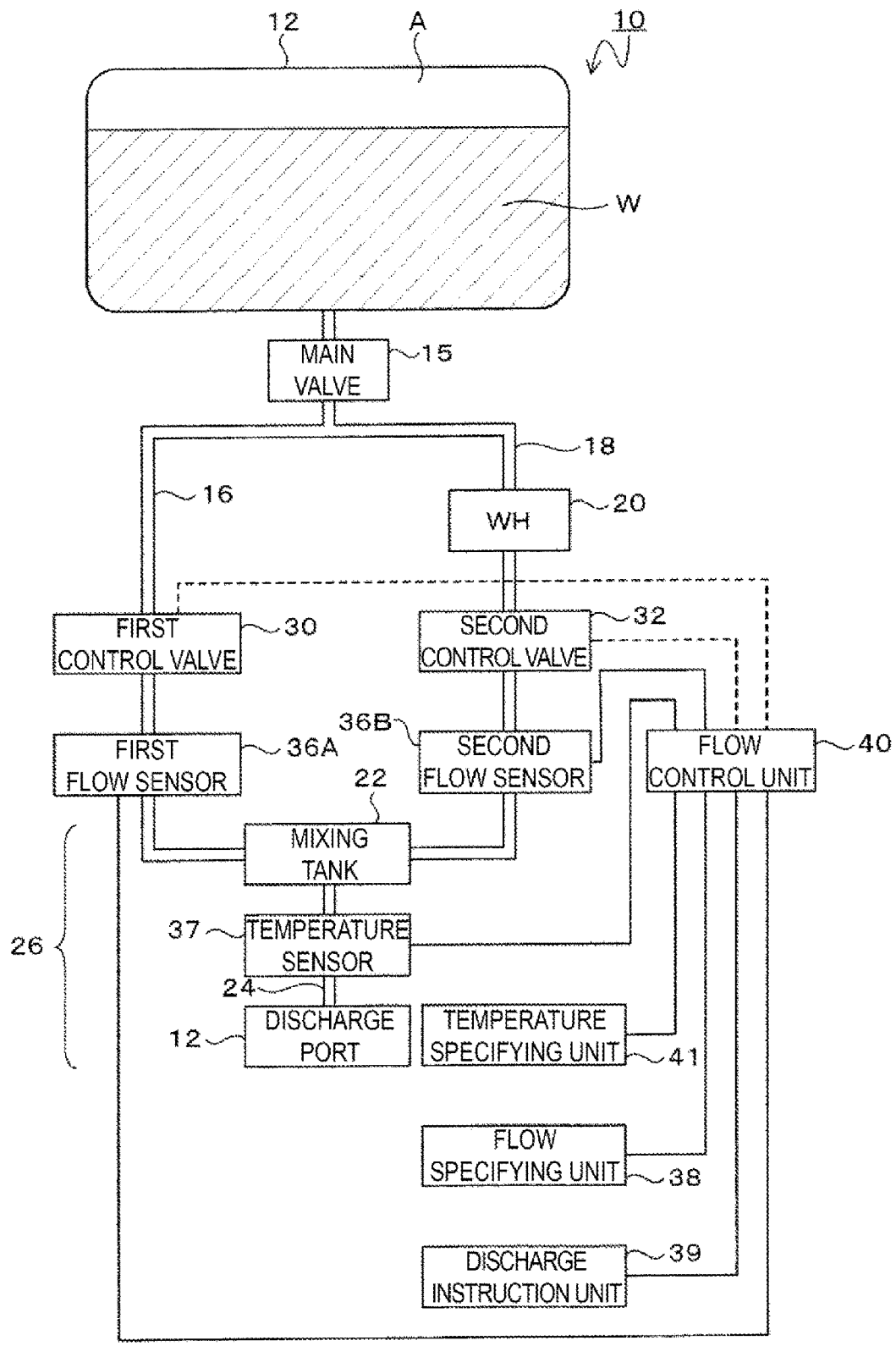
FIG. 4 is a diagram illustrating another configuration of the aircraft water supply system 10.

In addition, as illustrated in FIG. 4, a temperature sensor 37 may be provided on a flow path (anywhere from the water tank 14 to the water discharge port 12) so that the temperature of the water discharged from the water discharge port 12 can be adjusted with higher accuracy.

In the example of FIG. 4, the temperature sensor 37 is provided in the mixing supply unit 26 (on the flow path connecting the mixing tank 22 and the water discharge port 12) to detect the water temperature in a state in which cold water flowing through the cold water flow path 16 and hot water flowing in the hot water flow path 18 are mixed. In FIG. 4, the temperature sensor 37 is provided downstream from the mixing tank 22 and upstream from the water discharge port 12, but, for example, the temperature sensor 37 may be provided in the mixing tank 22, and the temperature sensor 37 may be provided in the cold water flow path 16 and the hot water flow path 18, respectively.

The detection value of the temperature sensor 37 is output to the flow control unit 40, which will be described later.

As illustrated in FIG. 4, when the temperature sensor 37 is provided in the mixing supply unit 26, the detection value of the temperature sensor 37 is approximately equal to the temperature of the water discharged from the water discharge port 12. Thus, for example, when the detection value of the temperature sensor 37 is higher than the target temperature, the first control valve 30 (the cold water side) is controlled to the opening direction, and the second control valve 32 (the hot water side) is controlled to the closing direction so that the amount of the cold water flowing toward the water discharge port 12 is increased and the amount of the hot water flowing toward the water discharge port 12 is decreased. Further, for example, when the detection value of the temperature sensor 37 is lower than the target temperature, the first control valve 30 (the cold water side) is controlled to the closing direction, and the second control valve 32 (the hot water side) is controlled to the opening direction, so that the amount of the cold water flowing toward the water discharge port 12 is decreased and the amount of the hot water flowing toward the water discharge port 12 is increased.

In this way, by controlling the flow rate of cold water and hot water (the opening/closing state of the first control valve 30 and the second control valve 32) based on the water temperature detected by the temperature sensor 37, the temperature of the water can be adjusted at higher accuracy, and the convenience of the user can be improved.

Figure 5:
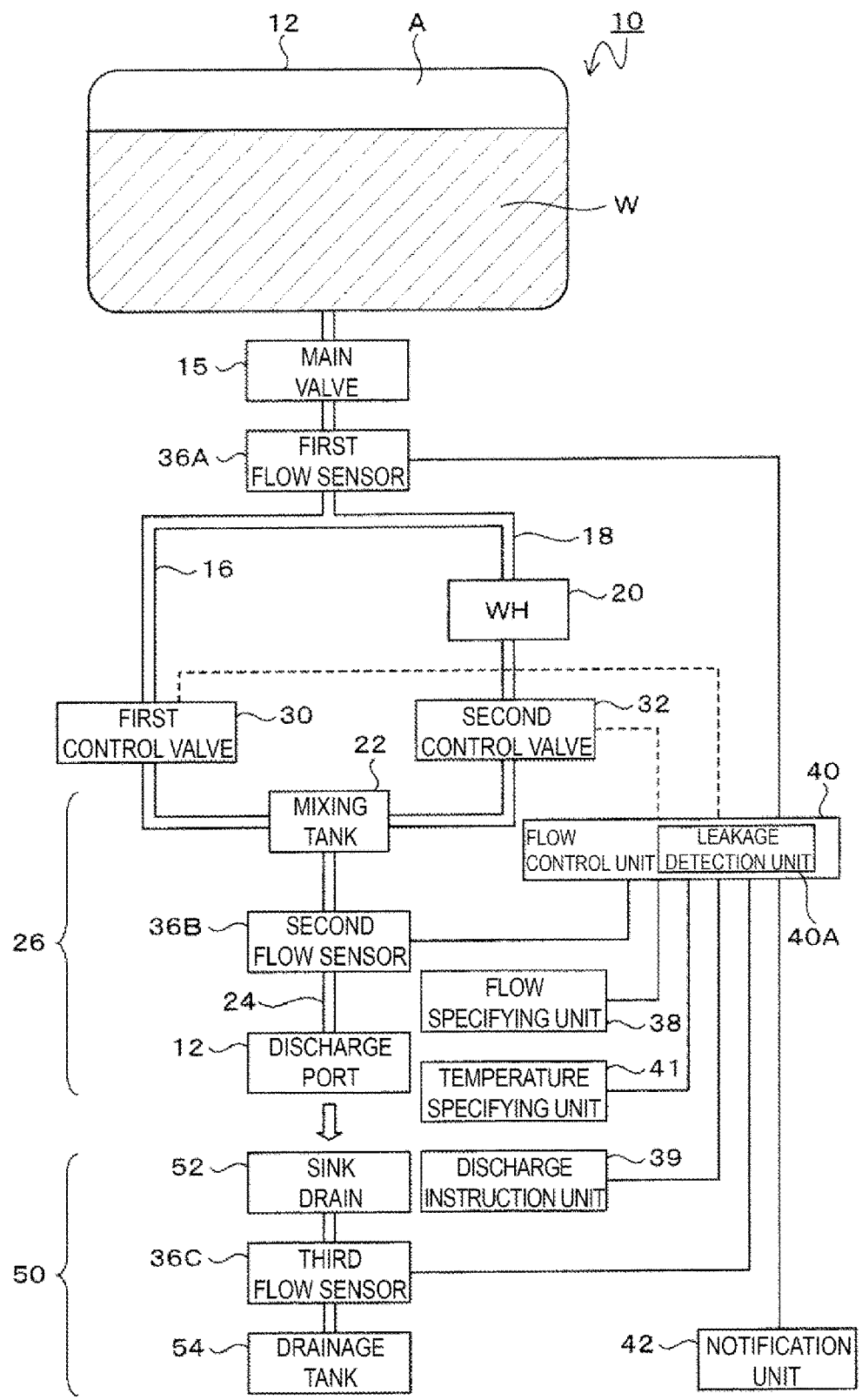
FIG. 5 is a diagram illustrating another configuration of the aircraft water supply system 10.

In addition, as illustrated in FIG. 5, the first flow sensor 36A may be provided directly below the main valve 15 (for example, before the branching point between the cold water flow path 16 and the hot water flow path 18), the second flow sensor 36B may be provided in the mixing supply unit 26 (on the mixing flow path 24), and a leakage detection unit 40A may be provided in the flow control unit 40 (or separately from the flow control unit 40).

The leakage detection unit 40A calculates a difference between the flow rate detected by the first flow sensor 36A and the flow rate detected by the second flow sensor 36B and determines that water leakage may occur at any point on the flow path (in particular, the flow path between the first flow sensor 36A and the second flow sensor 36B) when a state where the difference is equal to or greater than a predetermined amount continues for a predetermined period or longer.

That is, in the embodiment of FIG. 5, at least two flow sensors 36 are provided on the upstream side (the first flow sensor 36A in FIG. 5) and the downstream side (the second flow sensor 36B in FIG. 5) of the flow path up to the water discharge port 12, and the leakage detection unit 40A that determines that water leakage may occur in the flow path between the two flow sensors 36A and 36B when a state where the difference between the flow rates detected by the two flow sensors 36A and 36B is equal to or greater than a predetermined amount continues for a predetermined period or longer is further provided.

The predetermined period is set to be equal to or greater than the time required for the water in a flow path to move through the flow path between the first flow sensor 36A and the second flow sensor 36B at a normal flow rate, for example.

When the possibility of water leakage is detected by the leakage detection unit 40A, a notification unit 42 reports the possibility of water leakage to a crew member or the like of an aircraft. The notification unit 42 is provided with, for example, a voice output mechanism, a lamp, a text display unit, or the like, and reports the possibility of water leakage by outputting a message via voice or display ("there is a possibility of water leakage"), blinking a lamp, outputting a beep sound, and the like.

Furthermore, as illustrated in the lower part of the sheet of FIG. 5, a flow sensor (third flow sensor 36C) may be provided in a drainage mechanism 50 that drains the water discharged from the water discharge port 12.

The drainage mechanism 50 includes a sink drain 52 provided in a sink (not illustrated) for receiving the water discharged from the water discharge port 12, a drainage tank 54 that stores waste water, and a drain pipe 56 that connects the sink drain 52 and the drainage tank 54. The third flow sensor 36C is provided in the drain pipe 56 to detect the flow rate of the waste water.

When the third flow sensor 36C is provided in the drainage mechanism 50, although a difference due to the amount of water used by the user needs to be considered in the predetermined amount (a flow rate difference threshold for determination of water leakage), a threshold is set as appropriate, for example, determining that the possibility of water leakage is present when the flow rate difference continues to spread for 5 minutes or longer.

As described above, in the aircraft water supply system 10, water leakage may occur in the mixing tank 22, a piping connection portion, the water discharge port 12, and the like. Although it is possible to stop the water immersion by closing the main valve 15, there has been a problem that discovery is delayed with high probability, particularly when the water immersion occurs in the internal piping that is invisible to the user.

As illustrated in FIG. 5, the leakage detection unit 40A detects the leakage of water based on the flow rate difference between the two flow sensors, which is advantageous in detecting the leakage of water at an early stage and taking measures to minimize the damage of water immersing into the surrounding area.

The invention claimed is:

1. An aircraft water supply system for supplying water to a water discharge port in an aircraft, the system comprising:
   a cold water flow path that supplies cold water to the water discharge port;
   a hot water flow path that supplies hot water to the water discharge port;
   a first control valve that adjusts a flow rate of the cold water flowing through the cold water flow path;
   a second control valve that adjusts a flow rate of the hot water flowing through the hot water flow path;
   a flow sensor that detects a flow rate of water at any point up to the water discharge port; and
   a flow control unit that controls an opening/closing state of the first control valve and the second control valve based on a detection value of the flow sensor so that an amount of the water discharged from the water discharge port reaches a predetermined target flow rate; wherein
   the flow sensor comprises a first flow sensor that detects the flow rate of the cold water flowing through the cold water flow path and a second flow sensor that detects the flow rate of the hot water flowing through the hot water flow path,
   the first flow sensor is provided upstream from the first control valve and the second flow sensor is provided upstream from the second control valve, and
   the flow control unit estimates that a value obtained by multiplying the flow rate detected by the first flow sensor, the degree of opening of the first control valve, and a coefficient based on characteristics of the first control valve is a flow rate in the cold water flow path, and a value obtained by multiplying the flow rate detected by the second flow sensor, the degree of opening of the second control valve, and a coefficient based on characteristics of the second control valve is a flow rate in the hot water flow path.

2. The aircraft water supply system according to claim 1, further comprising a flow specifying unit that specifies a flow rate of the water to be discharged from the water discharge port, wherein the flow control unit sets the target flow rate based on the flow rate specified by the flow specifying unit.

3. The aircraft water supply system according to claim 1, wherein the flow control unit controls the opening/closing state of the first control valve and the second control valve so that a degree of opening of the second control valve is relatively smaller than a degree of opening of the first control valve.

4. The aircraft water supply system according to claim 1, further comprising a temperature specifying unit that specifies a temperature of the water to be discharged from the water discharge port, wherein the flow control unit sets a flow rate ratio of the flow rate of the cold water flowing through the cold water flow path to the flow rate of the hot water flowing through the hot water flow path based on the temperature specified by the temperature specifying unit.

5. The aircraft water supply system according to claim 4, further comprising a temperature sensor that detects a water temperature at any point up to the water discharge port, wherein the flow control unit controls the opening/closing state of the first control valve and the second control valve based on the water temperature detected by the temperature sensor so that the temperature of the water to be discharged from the water discharge port reaches the temperature specified by the temperature specifying unit.

6. The aircraft water supply system according to claim 1, wherein at least two flow sensors are provided on an upstream side and a downstream side of a flow path up to the water discharge port, the system further comprising:

a leakage detection unit that determines that water leakage may occur in a flow path between the two flow sensors when a state where a difference between the flow rates detected by the at least two flow sensors is equal to or greater than a predetermined amount continues for a predetermined period or longer.

7. The aircraft water supply system according to claim 1, wherein the first control valve and the second control valve are proportionality control valves of which the degree of opening can be adjusted as desired.

* * * * *